US006499691B1

(12) United States Patent
Lyons

(10) Patent No.: US 6,499,691 B1
(45) Date of Patent: Dec. 31, 2002

(54) METHOD OF ROTATING AIRCRAFT WHEELS

(76) Inventor: Dennis E. Lyons, 109 County Rd., 8X, Texas Creek, CO (US) 81223

( * ) Notice: Subject to any disclaimer, the term of this patent is extended or adjusted under 35 U.S.C. 154(b) by 0 days.

(21) Appl. No.: 09/299,453

(22) Filed: Apr. 26, 1999

(51) Int. Cl.[7] .............................................. B64C 25/40
(52) U.S. Cl. .............................. 244/103 S; 244/103 R
(58) Field of Search ........................... 244/103 S, 100 R

(56) References Cited

U.S. PATENT DOCUMENTS

| 657,124 | A | * | 9/1900 | Libbey |
| 1,546,789 | A | * | 7/1925 | Novak |
| 2,027,960 | A | * | 1/1936 | Crossley |
| 2,454,627 | A | * | 11/1948 | Brandt et al. |
| 5,104,063 | A | * | 4/1992 | Hartley |
| 5,165,624 | A | * | 11/1992 | Lewis et al. |
| 5,746,393 | A | * | 5/1998 | Gennaro |

FOREIGN PATENT DOCUMENTS

| DE | 3105651 | * | 9/1982 | ............. 244/103 S |
| DE | 3512324 | * | 10/1985 | ............. 244/103 S |
| WO | 83/01239 | * | 9/1982 | ............. 244/103 S |

* cited by examiner

*Primary Examiner*—Charles T. Jordan
*Assistant Examiner*—Tien Dinh
(74) *Attorney, Agent, or Firm*—G. F. Gallinger

(57) ABSTRACT

Aircrafts typically touch down with their wheels not rotating. Their tires skid for a few hundred feet before they turn the ground speed of the aircraft. Tire failure, and pollution can be largely eliminated by rotating the wheels prior to touchdown. A simple safe method to rotate the wheels on an aircraft comprises the following steps: using a rotatable circular member having an outer rim portion, an inner hub portion adapted for connection to the axle, and, a central portion. Arranging laterally extending multiple vanes to the central portion so that airflow from a front side of the aircraft will not pass through the member and will cause the circular member to rotate in a forward direction. And providing a shroud to cover an upper portion of the rotatable circular member so that airflow may only pass over the vanes on a lower portion of the rotatable circular member. In one preferred aspect of this invention the rotatable circular member is a wheel, in a second aspect of the invention the rotatable circular member is a cylinder.

4 Claims, 1 Drawing Sheet

METHOD OF ROTATING AIRCRAFT WHEELS

FIELD OF INVENTION

This invention relates to landing gear on aircraft. More particularly this invention relates to a simple method which will automatically result in rotating the aircraft wheels when the landing gear is lowered.

BACKGROUND OF THE INVENTION

When a large aircraft is several minutes from its destination it lowers its landing gear. When the aircraft touches down, whatever its ground speed, its wheels are not rotating. For a thousand feet runways are black with skid marks. The relatively small tires on the aircraft have a very short life. Bearing tremendous loads they skid for hundreds of feet when the aircraft touches down onto the runway. Blue smoke billows from the wheels.

OBJECTS AND STATEMENT OF INVENTION

It is an object of this invention to disclose a method which will result in the wheels under an aircraft automatically rotating when the landing gear is lowered. It is an object of this invention to greatly reduce tire abrasion, to greatly extend tire life, and to largely prevent tire failure on the aircraft. It is an object of this invention to greatly reduce landing gear, strut, and wheel bearing stress on an aircraft. It is a further object of this invention to eliminate passenger forward head motion when an aircraft touches down. It is a final object of this invention to eliminate airborne tire smoke and pollution when an aircraft lands.

The invention provides for a method of automatically rotating a wheel on an aircraft before landing comprising the following steps: using a rotatable circular member on an axle of a landing gear of an aircraft having an outer rim portion, an inner hub portion adapted for connection to the axle, and, a central portion extending between the outer rim portion and the inner hub portion; and, arranging multiple vanes laterally extending from the central portion so that airflow from a front side of the aircraft may not pass through the rotatable circular member and will cause the circular member to rotate in a forward direction.

In one preferred aspect of this invention the rotatable circular member is a wheel. In a second preferred aspect of the invention the rotatable circular member is a cylinder.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
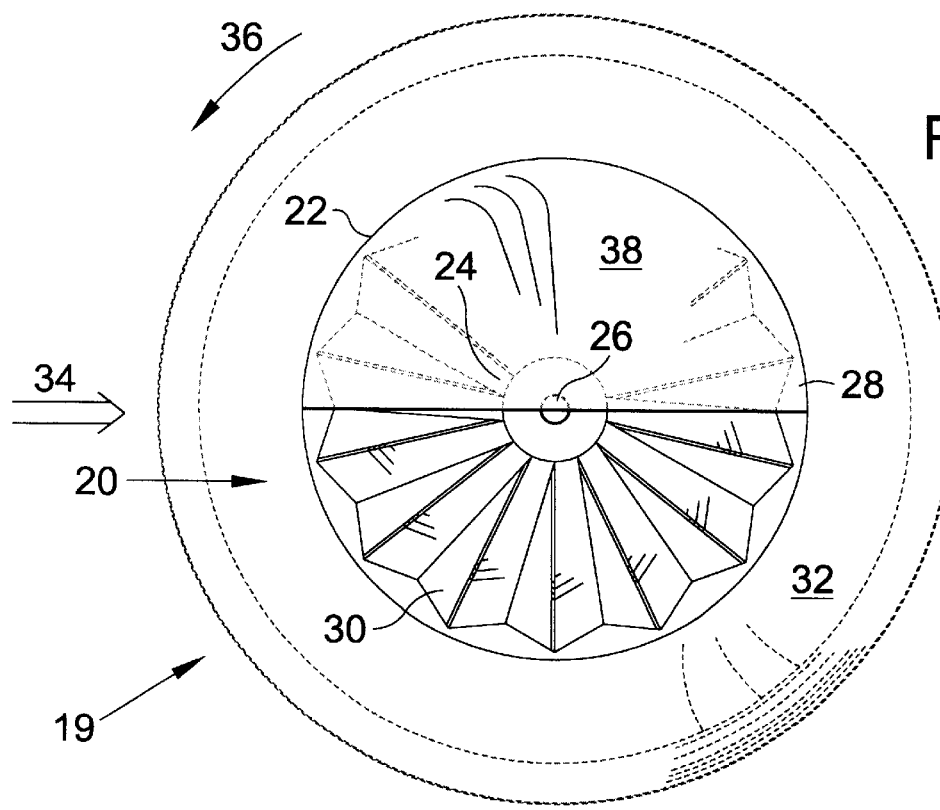
FIG. 1 is an elevational view of an aircraft wheel having radial louvres therearound.

The following is a discussion and description of the preferred specific embodiments of this invention, such being made with reference to the drawings, wherein the same reference numerals are used to indicate the same or similar parts and/ or structure. It should be noted that such discussion and description is not meant to unduly limit the scope of the invention.

DESCRIPTION OF THE INVENTION

Turning now to the drawings and more particularly to FIG. 1 we have an elevational view of an aircraft wheel 19 having radial louvres 30 therearound. More generally the invention comprises the method of using a rotatable circular member 20 on an axle 26 of a landing gear of an aircraft 18. The rotatable circular member 20 has an outer rim portion 22, an inner hub portion 24 adapted for connection to the axle, and, a central portion 28 extending between the outer rim portion 22 and the inner hub portion 24. Multiple vanes which preferably are louvres 30, are arranged to extend 20 radially and laterally from the central portion 28 so that airflow 34 from a front side of the landing gear of the aircraft 18 will not pass through the rotatable circular member 20 and will cause the circular member 20 to rotate in a forward direction 36.

In one aspect of the invention, as shown in FIG. 1, the rotatable member 20 comprises a wheel 19 which has the outer rim portion 22 thereof adapted for mounting a tire 32 therearound. Most preferably, a shroud 38 is used to cover an upper portion of the wheel 19 so that airflow 34 will only be over the vanes 30 on a lower portion of the wheel 19.

Figure 2:
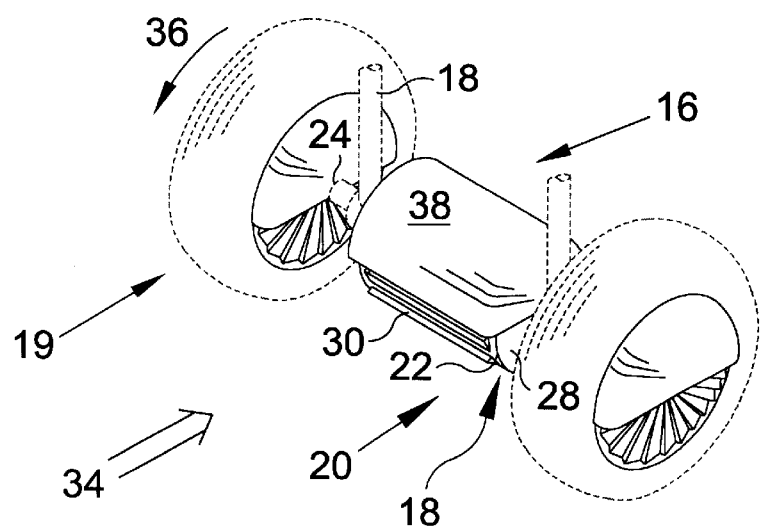
FIG. 2 is a perspective view of a lower portion of the landing gear on an aircraft showing the louvred wheel of FIG. 1 and additionally having a cylindrical member to rotate the aircraft wheels.

FIG. 2 is a perspective view of a lower portion of the landing gear on an aircraft 18 showing the louvred wheel of FIG. 1 and additionally having a cylindrical member 16 to rotate the aircraft wheels 19. In this second aspect of the invention, the rotatable circular member 20 comprises a cylinder 16. Most preferably a shroud 38 is used to cover an upper portion of the cylinder 16 so that airflow 34 will only be over the louvres 30 on the lower portion of the cylinder 16.

Airflow 34 will catch the louvres 30 when the landing gear 18 is lowered. Typically on a large aircraft the landing gear 18 is lowered well in advance of landing not only to assure that it is functioning properly, but additionally to provide drag. By the time the aircraft (not shown) touches down the wheels 19 will be rotating at ground speed so that the skidding and blue smoke is eliminated. The passengers (not shown) will not experience forward head motion when the rotating wheels 19 strike the runway (not shown).

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A method of automatically rotating a wheel on a landing gear of an aircraft before landing comprising the following steps:

providing a cylindrical rotatable member having an outer rim portion, an inner hub portion adapted for connection to the axle, and, a central portion extending between the outer rim portion and the inner hub portion;

arranging multiple vanes laterally extending from the central portion so that airflow from a front side of the landing gear of the aircraft will cause the cylindrical member to rotate in a forward direction; and, providing a shroud covering an upper portion of the cylindrical member so that the airflow may only directly impinge the vanes on a lower portion of the cylindrical member.

2. A method as in claim 1 wherein the vanes extend generally radially.

3. A method as in claim 2 wherein the vanes comprise louvres.

4. A method as in claim 1 wherein the vanes are arranged so that airflow cannot pass through the cylindrical member.

* * * * *